March 22, 1932. L. H. CUMMINGS 1,850,498
SHOVEL
Filed Sept. 15, 1931
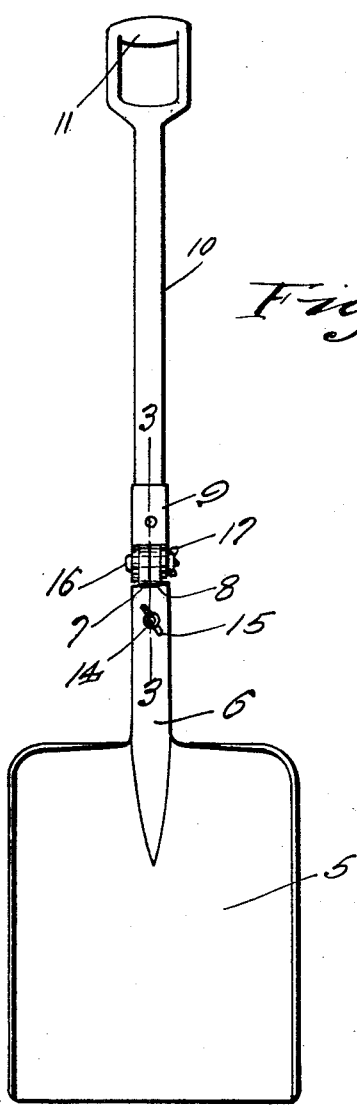
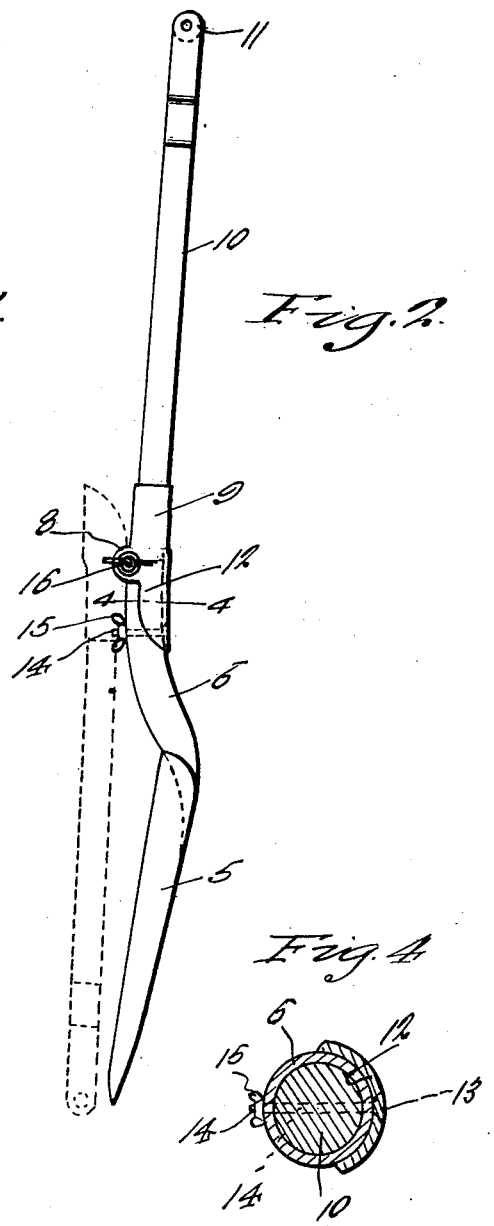
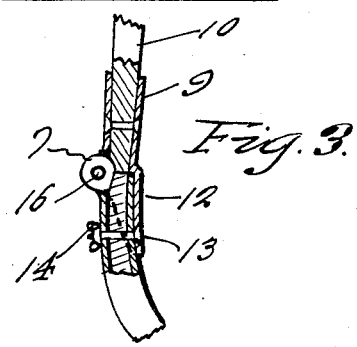
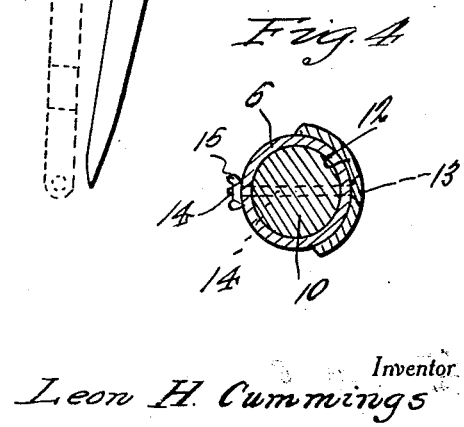
Inventor
Leon H. Cummings
By Clarence A. O'Brien
Attorney Patented Mar. 22, 1932

1,850,498

UNITED STATES PATENT OFFICE

LEON H. CUMMINGS, OF WARE, MASSACHUSETTS

SHOVEL

Application filed September 15, 1931. Serial No. 562,945.

This invention appertains to new and useful improvements in shovels.

The principal object of this invention is to provide a shovel which may be readily collapsible to permit storage in a limited space.

Another important object of the invention is to provide a shovel wherein the usual handle is divided into hinged sections to permit collapsibility without sacrificing stability.

Other important objects and advantages of the invention will become apparent to the reader of the following specification.

In the drawings:—

Figure 1 represents a front elevational view of the shovel.

Fig. 2 represents a side elevational view of the shovel.

Fig. 3 represents a fragmentary vertical sectional view taken substantially on the line 3—3 of Fig. 1.

Fig. 4 represents a horizontal sectional view taken substantially on the line 4—4 of Fig. 2.

Referring to the drawings wherein like numerals designate like parts it can be seen that numeral 5 represents the blade of the shovel having the hollow shank portion 6 extending therefrom. This hollow shank 6 is preferably filled with a wooden filler which terminates at the outer end of the shank.

As is clearly shown in Fig. 1, the outer end of the shank 6 is equipped with an apertured ear 7, the aperture of which is registrable with the aperture of the ear 8 on the ferrule 9 which is secured to the inner end portion of the handle section 10 which is equipped with the usual hand grip 11. The ferrule 9 can be secured in any suitable manner to the section 10 and has an outwardly projecting and tapering apron 12, with a counter-sunk opening therein. This counter-sunk opening receives the head 13 of a bolt 14, which can be passed through the intermediate portion of the shank 6 and is equipped with a wing nut 15, whereby the ferrule can be rigidly secured to the outer end of the neck 6 in the manner substantially shown in Fig. 2.

It will be observed, that a bolt 16 is passed through the apertured ears 7 and 8 and is also equipped with a wing nut 17 whereby the inter-connection between the neck 6 and ferrule 9 can be conducted into the desired tension.

Obviously, by removing the wing nut 15, and the bolt 14, the handle section 10 can be swung to the dotted line position shown in Fig. 2 without any difficulty. In this position, the nut 17 can be tightened on the bolt 16 and the handle section will readily remain in this collapsed position.

While the foregoing specification sets forth the invention in specific terms, it is to understood that numerous changes in the shape, size and materials may be resorted to without departing from the spirit and scope of the invention as claimed hereinafter.

Having thus described my invention, what I claim as new is:—

A shovel of the character described comprising a blade, a shank on the blade, a handle section, a hinged section between the shank and the handle section, an outwardly tapering apron on the handle section for engagement with the shank when the handle section is alined with the shank, and securing means between the apron and the said shank.

In testimony whereof I affix my signature.

LEON H. CUMMINGS.